United States Patent
Liang et al.

(10) Patent No.: US 7,453,775 B2
(45) Date of Patent: Nov. 18, 2008

(54) METHOD FOR DYNAMICALLY ADJUSTING HEADER REGION RF GAIN WHILE ACCESSING HEADER REGIONS OF DVD-RAM DISC AND APPARATUS THEREOF

(75) Inventors: Chia-Wei Liang, Taipei Hsien (TW); Hsueh-Wu Kao, Hsin-Chu Hsien (TW)

(73) Assignee: Mediatek Incorporation, Hsin-Chu, Hsien (TW)

( * ) Notice: Subject to any disclaimer, the term of this patent is extended or adjusted under 35 U.S.C. 154(b) by 808 days.

(21) Appl. No.: 10/907,997

(22) Filed: Apr. 25, 2005

(65) Prior Publication Data

US 2005/0254368 A1 Nov. 17, 2005

(30) Foreign Application Priority Data

May 12, 2004 (TW) .............................. 93113315 A

(51) Int. Cl.
G11B 15/52 (2006.01)
(52) U.S. Cl. ................. 369/47.27; 369/124.11
(58) Field of Classification Search ............... None
See application file for complete search history.

(56) References Cited

U.S. PATENT DOCUMENTS

| | | | |
|---|---|---|---|
| 5,729,511 A | 3/1998 | Schell | |
| 5,933,410 A | 8/1999 | Nakane | |
| 6,188,250 B1 | 2/2001 | Voorman | |
| 6,469,979 B1 | 10/2002 | Joo | |
| 6,477,131 B1 | 11/2002 | Tsuchinaga et al. | |
| 6,625,093 B1 * | 9/2003 | Hong et al. ............. | 369/44.32 |
| 2002/0031067 A1 | 3/2002 | Van Woudenberg | |

FOREIGN PATENT DOCUMENTS

| | | |
|---|---|---|
| EP | 0369472 A2 | 5/1990 |
| TW | 397977 | 7/2000 |
| TW | 427051 | 3/2001 |
| TW | 451184 | 8/2001 |

\* cited by examiner

Primary Examiner—Paul W. Huber
(74) Attorney, Agent, or Firm—Winston Hsu

(57) ABSTRACT

A method for dynamically adjusting a header region RF gain of a variable gain amplifier while accessing header regions of a DVD-RAM disc, and apparatus thereof. The method includes the following steps: irradiating a light spot on the DVD-RAM disc with a pickup head; detecting a 4T peak-to-peak level of a RF signal generated by the variable gain amplifier while the light spot is moving within a VFO1 column of a header region of the DVD-RAM disc; comparing the 4T peak-to-peak level with a target level; adjusting a header region RF gain of the variable gain amplifier according to a result of the comparing step.

13 Claims, 4 Drawing Sheets

| | Header1 | | | | |
|---|---|---|---|---|---|
| | VFO1 | AM | PID1 | IDE1 | PA1 |
| Number of bytes | 36 | 3 | 4 | 2 | 1 |

| | Header2 | | | | |
|---|---|---|---|---|---|
| | VFO2 | AM | PID2 | IDE2 | PA2 |
| Number of bytes | 8 | 3 | 4 | 2 | 1 |

| | Header3 | | | | |
|---|---|---|---|---|---|
| | VFO1 | AM | PID3 | IDE3 | PA1 |
| Number of bytes | 36 | 3 | 4 | 2 | 1 |

| | Header4 | | | | |
|---|---|---|---|---|---|
| | VFO2 | AM | PID4 | IDE4 | PA2 |
| Number of bytes | 8 | 3 | 4 | 2 | 1 |

Fig. 2 Related art

METHOD FOR DYNAMICALLY ADJUSTING HEADER REGION RF GAIN WHILE ACCESSING HEADER REGIONS OF DVD-RAM DISC AND APPARATUS THEREOF

BACKGROUND

The present invention relates to DVD-RAM, and more particularly, to a method for dynamically adjusting a header region RF gain of a variable gain amplifier while accessing header regions of a DVD-RAM disc, and apparatus thereof There are many different types of DVD standards that are currently utilized, including: a DVD±R standard, a DVD-RAM standard, and a DVD±RW standard. According to the DVD-RAM standard, a DVD-RAM disc includes a plurality of sectors. FIG. 1 shows a sector of a DVD-RAM disc. The sector consists of a header region and a recording region. The header region includes an upper header and a lower header; each of them contains two headers. In other words, a header region contains four headers. These headers are: a header1, a header2, a header3, and a header4. The data layout of a header region is illustrated in FIG. 2.

The header regions and recording regions of a DVD-RAM disc normally have different reflectance. Hence, an optical disc drive of a related art always utilizes two different RF gains to access the DVD-RAM disc; a header region RF gain is utilized when the header regions of the DVD-RAM disc are accessed and a recording region RF gain is utilized when the recording regions of the DVD-RAM disc are accessed. In addition, reflectance of different recording regions on different track positions does not always maintain a fixed value. Hence, for accessing data more accurately, the optical disc drive of the related art dynamically adjusts the recording region RF gain.

In actuality, reflectance of different header regions on different track positions does not always maintain a fixed value either. Unfortunately, many optical disc drives on the market are not capable of adjusting the header region RF gain dynamically when accessing header regions of DVD-RAM discs.

SUMMARY OF INVENTION

According to the claimed invention, a method for accessing header regions of a DVD-RAM disc is disclosed. The method comprises: irradiating a light spot on the DVD-RAM disc with a pick up head; detecting a peak-to-peak level of a 4T RF signal generated by a variable gain amplifier when the light spot is moving within a VFO1 column of a header region of the DVD-RAM disc; comparing the detected peak-to-peak level with a target level; and adjusting a RF gain of the variable gain amplifier according to a result of the comparing step. The variable gain amplifier is electrically connected to the pickup head for amplifying a RF signal outputted by the pickup head with the RF gain and generating the 4T RF signal accordingly.

According to the claimed invention, a RF gain adjusting apparatus of an optical disc drive is disclosed. The optical disc drive comprises a pickup head for irradiating a light spot onto a DVD-RAM disc. The RF gain adjusting apparatus comprises: a variable gain amplifier electrically connected to the pickup head, for amplifying a RF signal received from the pickup head with a RF gain when the light spot is moving within header regions of the DVD-RAM disc; a header region peak-to-peak detector electrically connected to the variable gain amplifier, for detecting a header region peak-to-peak level of an amplified RF signal generated by the variable gain amplifier when the light spot is moving within a VFO1 column of a header region of the DVD-RAM disc; and a feedback circuit electrically connected to the header region peak-to-peak detector and the variable gain amplifier, for comparing the header region peak-to-peak level with a header region target level and adjusting the RF gain accordingly.

BRIEF DESCRIPTION OF DRAWINGS

FIG. 2 shows a data layout of header regions of DVD-RAM discs.

DETAILED DESCRIPTION

The data layout of a header region of a DVD-RAM disc is illustrated in FIG. 2. Each of the four headers of a header region includes a column called "variable frequency oscillator" (abbreviated as VFO). More specifically, both the header1 and header3 have a VFO1 column; both the header2 and header4 have a VFO2 column. The data pattern of the VFO columns is unique. In other words, a VFO1 column contains 36 data bytes, or 576 channel bits, with a fixed data pattern: "00010001000100010001 . . . 00010001". Areas having this unique data pattern are referred to as 4T regions of the DVD-RAM disc.

When an optical disc drive is accessing a header region of a DVD-RAM disc, first a light spot is generated by a pickup head of the optical disc drive and is irradiated on a VFO1 column (which corresponds to a 4T region) of the DVD-RAM disc. Given the rotation of the DVD-RAM disc, the light spot is then moved to subsequent locations of the header region; information stored in the header region is therefore reproduced. The present invention utilizes the 4T regions to enable an optical disc drive to dynamically adjust a header region RF gain.

Figure 1:
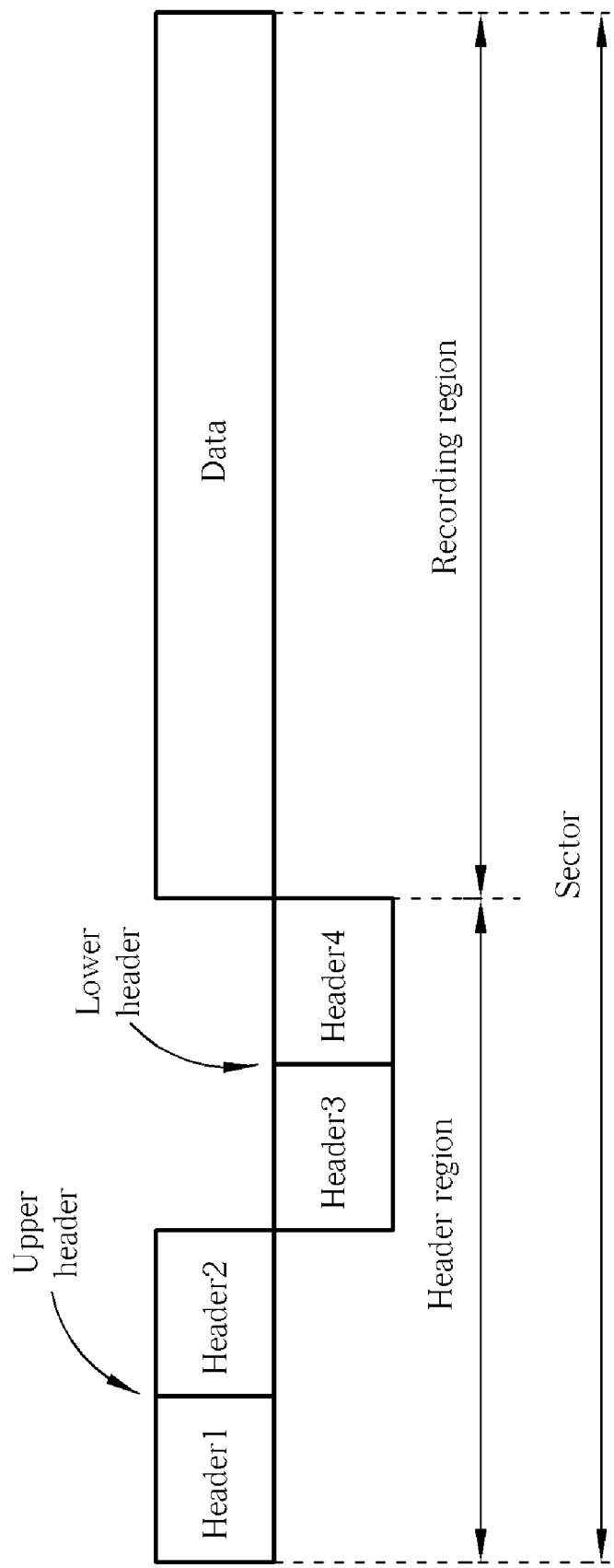
FIG. 1 shows a sector of a DVD-RAM disc.
Figure 3:
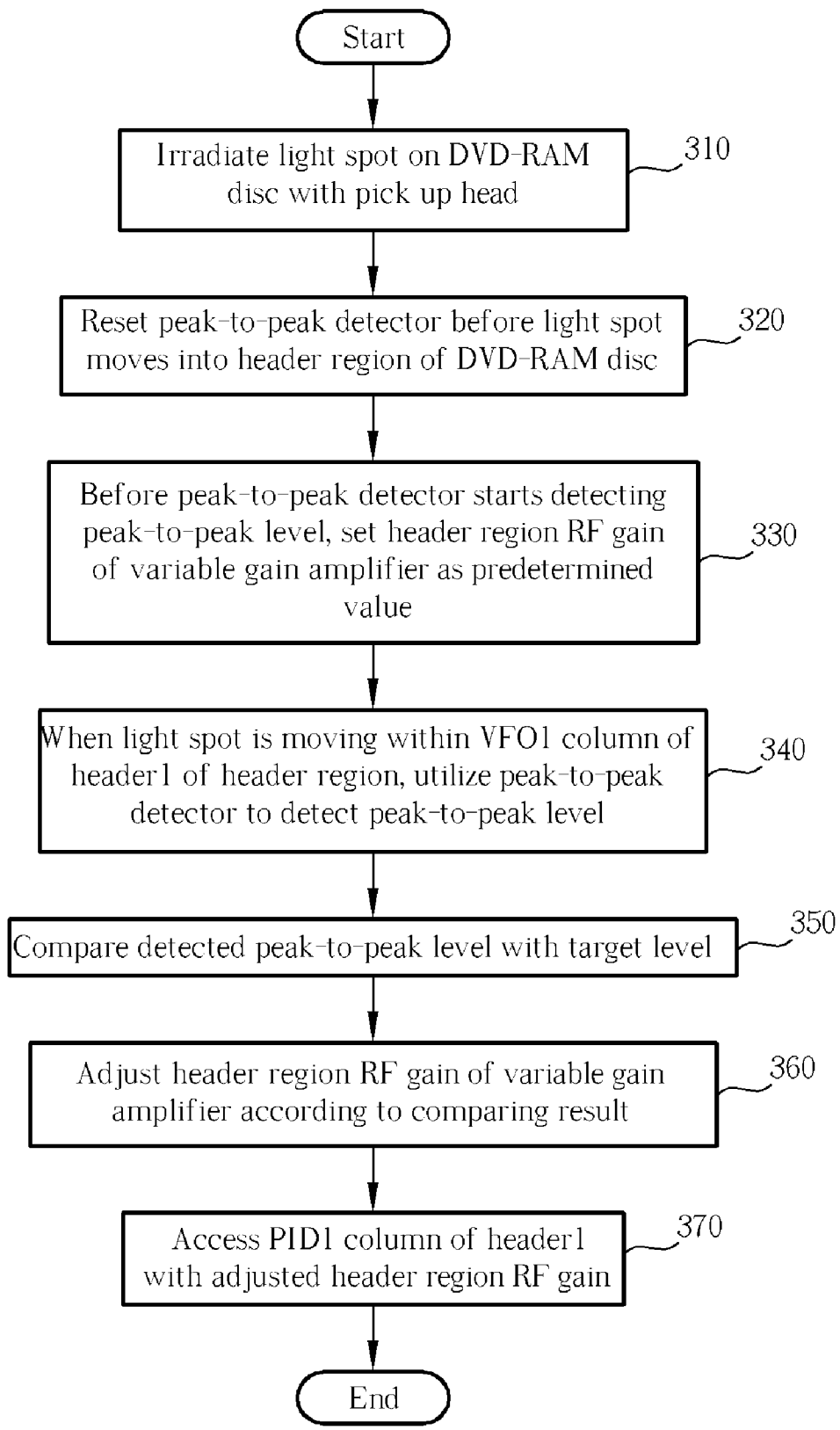
FIG. 3 shows a flowchart illustrating how the method of the present invention dynamically adjusts a header region RF gain.

Please refer to FIG. 3, which is a flowchart illustrating how the method of the present invention dynamically adjusts a header region RF gain when a header region of a DVD-RAM disc is accessed. The flowchart shown in FIG. 3 includes the following steps:

Step 310: Irradiate a light spot on the DVD-RAM disc with a pick up head.

Step 320: Reset a peak-to-peak detector before the light spot moves to the header region of the DVD-RAM disc.

Step 330: Before the peak-to-peak detector starts detecting a peak-to-peak level of an amplified RF signal generated by a variable gain amplifier (VGA), set the header region RF gain of the variable gain amplifier as a predetermined value. The variable gain amplifier is electrically connected to the pickup head for amplifying a RF signal generated by the pickup head with the header region RF gain and generating an amplified RF signal accordingly. In this step, if there is a retained value of the header region RF gain, the header region RF gain can be set to the retained value rather than the predetermined value.

Step 340: When the light spot is moving within a VFO1 column of a header1 of the header region, utilize the peak-to-peak detector to detect a peak-to-peak level of the RF signal generated by the variable gain amplifier. The detected peak-to-peak level can be referred to as a 4T peak-to-peak level.

Step 350: Compare the detected peak-to-peak level with a target level.

Step 360: Adjust the header region RF gain of the variable gain amplifier according to a comparing result of step 350.

Step 370: Access a PID1 column of the header1 with the adjusted header region RF gain.

In steps 340, 350, and 360, the header region RF gain of the variable gain amplifier is adjusted when the light spot is moving in the VFO1 column of the header1. In actuality, a VFO1 column contains a total of 144 4T periods. Utilizing some of the 4T periods may be sufficient for the RF gain adjusting process. The system designers can set a counter to count the number of passed 4T periods and then stop the header region RF gain adjusting process after the counter reaches a specific value that may be less than 144 (the total number of 4T periods).

In the flowchart shown in FIG. 3, only accessing of the PID1 column of the header1 with the adjusted header region RF gain is mentioned. However, after the header region RF gain is properly adjusted, it can also be utilized to access other columns of the header region, such as a PID2 , PID3 , and PID4 column and an IDE1 , IDE2, IDE3, IDE4 column. Additionally, the header region RF gain can also be adjusted while the light spot is moving within a VFO1 column of a header3 of the header region or VFO2 columns of a header2 and header3 of the header region. However, since there are fewer 4T periods in the VFO2 columns, accurate adjustment might not be achieved.

Figure 4:
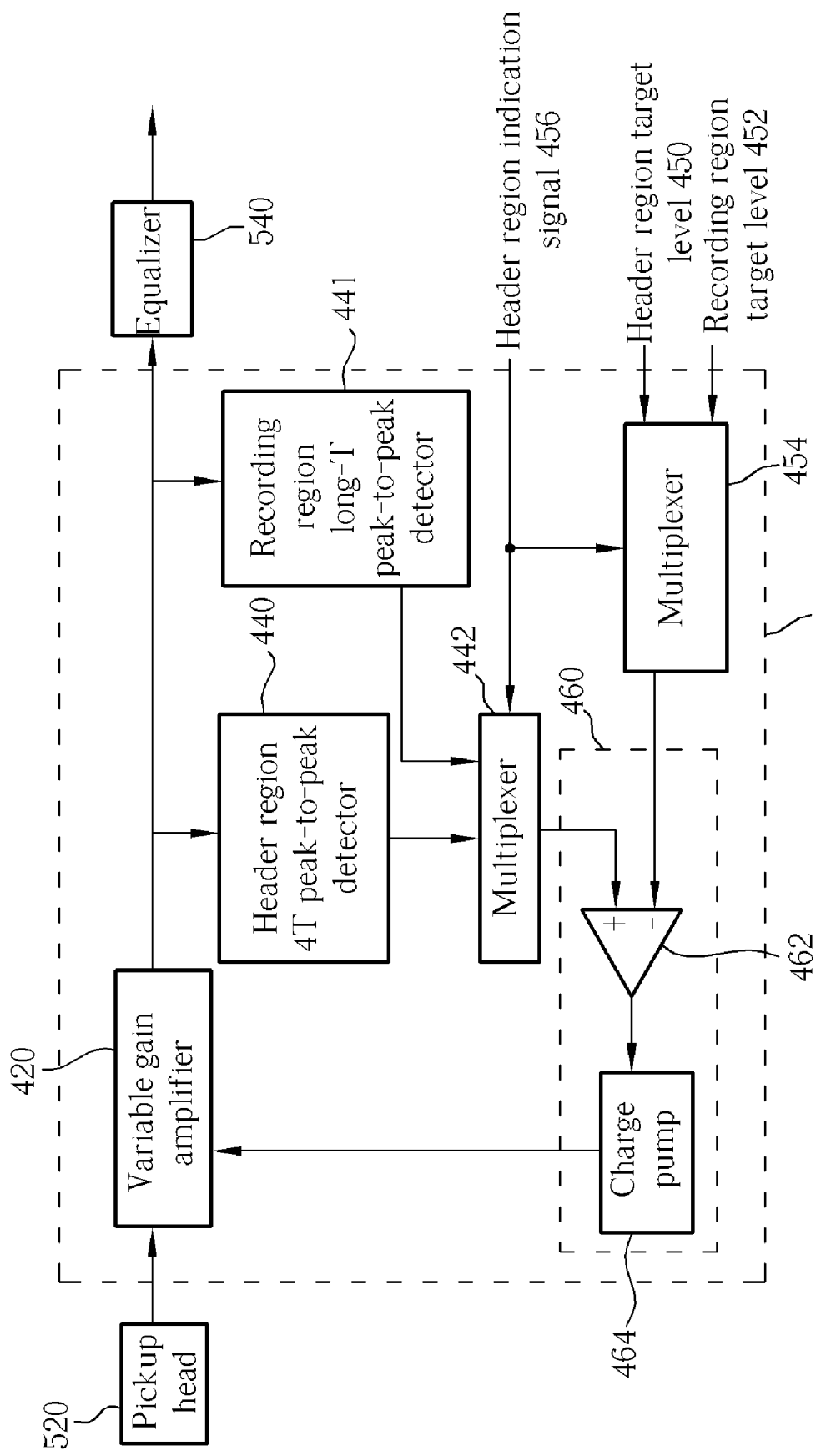
FIG. 4 shows a block diagram of a RF gain adjusting apparatus according to an embodiment of the present invention.

Please refer to FIG. 4, which is a block diagram of a RF gain adjusting apparatus according to an embodiment of the present invention. The RF gain adjusting apparatus 400 is set in an optical disc drive. The optical disc drive comprises a pickup head 520 and an equalizer 540. The pickup head 520 irradiates a light spot onto a DVD-RAM disc. The RF gain adjusting apparatus 400 comprises a variable gain amplifier 420, a header region 4T peak-to-peak detector 440, a recording region long-T peak-to-peak detector 441, a first multiplexer 442, a second multiplexer 454, and a feedback circuit 460.

The variable gain amplifier 420 is electrically connected to the pickup head 520, for amplifying RF signals generated by the pickup head 520 when the light spot is moving on the DVD-RAM disc. Both the header region 4T peak-to-peak detector 440 and the recording region long-T peak-to-peak detector 441 are electrically connected to the variable gain amplifier 420. The header region 4T peak-to-peak detector 440 detects a peak-to-peak level of the amplified RF signal generated by the variable gain amplifier 420 when the light spot is moving within a VFO1 column of a header of a header region. Since 4T periods of the VFO1 column are quite short, the header region 4T peak-to-peak detector 440 must have a high response speed. The recording region long-T peak-to-peak detector 441 detects a peak-to-peak level of the amplified RF signal generated by the variable gain amplifier 420 when the light spot is moving within a recording region. Since long-T periods of the recording region are longer, the recording region long-T peak-to-peak detector 441 can have a lower response speed. The multiplexer 442 determines whether the header region 4T peak-to-peak detector 440 or the recording region long-T peak-to-peak detector 441 is going to be utilized according to a header region indication signal 456. The feedback circuit 460 is electrically connected to the multiplexer 442, the multiplexer 454, and the variable gain amplifier 420. The feedback circuit 460 receives a peak-to-peak level (which can be the peak-to-peak level generated by the header region 4T peak-to-peak detector 440 or the recording region long-T peak-to-peak detector 441) from the multiplexer 442, and receives a target level (which can be a header region target level 450 or a recording region target level 452) from the multiplexer 454. The feedback circuit 460 further compares the two received values, and adjusts the RF gain (which can be a header region RF gain or a recording region RF gain) of the variable gain amplifier 420 according to the comparing result. Both the multiplexer 442 and multiplexer 454 are controlled according to the header region indication signal 456. When the multiplexer 442 sends the peak-to-peak level generated by the header region 4T peak-to-peak detector 440 to the feedback circuit 460, the multiplexer 454 outputs the header region target level 450. When the multiplexer 442 sends the peak-to-peak level generated by the recording region long-T peak-to-peak detector 441 to the feedback circuit 460, the multiplexer 454 outputs the recording region target level 452.

The feedback circuit 460 of this embodiment includes a comparator 462 and a charge pump 464. The comparator 462 is electrically connected to the multiplexer 442 and multiplexer 454, for comparing the peak-to-peak level received from the multiplexer 442 with the target level received from the multiplexer 454. The charge pump 464 is connected between the comparator 462 and the variable gain amplifier 420. The charge pump adjusts the RF gain of the variable gain amplifier 420 according to a comparing result generated by the comparator 462.

Please note that in this embodiment, when the optical disc is accessing the header region of the DVD-RAM disc, the feedback circuit 460 adjusts the header region RF gain of the variable gain amplifier 420 only during the time period when the light spot is moving within the VFO1 columns or VFO2 columns of the header region. During the time when the light spot is moving within other columns of the header region, the function of the feedback circuit 420 can be disabled, and the variable gain amplifier 420 retains the adjusted RF gain to access these columns of the header region.

In the embodiment shown in FIG. 4, the variable gain amplifier 420 and the feedback circuit 460 are utilized when the header regions or recording regions of the DVD-RAM disc are accessed. In actuality, two sets of circuits can also be utilized. More specifically, one set of circuits is utilized when the header regions are accessed, which includes a variable gain amplifier, a header region 4T peak-to-peak detector, and a feedback circuit. The other set of circuits is utilized when the recording regions are accessed, which includes a variable gain amplifier, a recording region long-T peak-to-peak detector, and a feedback circuit.

In contrast to the related art, the method and related apparatus of the present invention dynamically adjusts a header region RF gain of a variable gain amplifier. With the header region RF gain being dynamically adjusted, information stored in header regions of a DVD-RAM disc is reproduced more accurately.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for accessing header regions of a DVD-RAM disc, comprising:

irradiating a light spot on the DVD-RAM disc with a pick up head;

detecting a peak-to-peak level of a 4T RF signal generated by a variable gain amplifier when the light spot is moving within a VFO1 column of a header region of the DVD-RAM disc;

comparing the detected peak-to-peak level with a target level; and adjusting a RF gain of the variable gain amplifier according to a result of the comparing step;

wherein the variable gain amplifier is electrically connected to the pickup head for amplifying a RF signal outputted by the pickup head with the RF gain and generating the 4T RF signal accordingly.

2. The method of claim 1, further comprising:
accessing a PID1 column of the header region with the adjusted RF gain.

3. The method of claim 1, further comprising:
retaining a value of the adjusted RF gain after the light spot leaves the header region.

4. The method of claim 3, further comprising:
after the light spot enters a next header region of the DVD-RAM disc and before another peak-to-peak level is detected with respect to the next header region, continuing to utilize the retained value as the RF gain of the variable gain amplifier to access the next header region.

5. The method of claim 1, further comprising:
after the light spot enters a next header region of the DVD-RAM disc and before another peak-to-peak level is detected with respect to the next header region, utilizing a predetermined value as the RF gain of the variable gain amplifier to access the next header region.

6. The method of claim 1, further comprising:
resetting a peak-to-peak detector before the light spot enters the header region, wherein the peak-to-peak detector is for detecting the peak-to-peak level.

7. The method of claim 1, further comprising:
resetting a peak-to-peak detector after the light spot enters the VFO1 column of the header region, wherein the peak-to-peak detector is for detecting the peak-to-peak level.

8. A RF gain adjusting apparatus of an optical disc drive, the optical disc drive comprising a pickup head for irradiating a light spot onto a DVD-RAM disc, the RF gain adjusting apparatus comprising:

a variable gain amplifier electrically connected to the pickup head, for amplifying a RF signal received from the pickup head with a RF gain when the light spot is moving within header regions of the DVD-RAM disc;

a header region peak-to-peak detector electrically connected to the variable gain amplifier, for detecting a header region peak-to-peak level of an amplified RF signal generated by the variable gain amplifier when the light spot is moving within a VFO1 column of a header region of the DVD-RAM disc; and a feedback circuit electrically connected to the header region peak-to-peak detector and the variable gain amplifier, for comparing the header region peak-to-peak level with a header region target level and adjusting the RF gain accordingly.

9. The apparatus of claim 8, wherein the feedback circuit comprises:

a comparator electrically connected to the header region peak-to-peak detector, for comparing the header region peak-to-peak level with the header region target level; and a charge pump electrically connected between the comparator and the variable gain amplifier, for adjusting the RF gain of the variable gain amplifier according to a comparing result generated by the comparator.

10. The apparatus of claim 8, wherein after the light spot leaves the VFO1 column of the header region, the variable gain amplifier retains a value of the adjusted RF gain.

11. A RF gain adjusting apparatus of an optical disc drive, the optical disc drive comprising a pickup head for irradiating a light spot onto a DVD-RAM disc, the RF gain adjusting apparatus comprising:

a variable gain amplifier electrically connected to the pickup head, for amplifying a header region RF signal received from the pickup head with a header region RF gain when the light spot is moving within a header region of the DVD-RAM disc, and for amplifying a recording region RF signal received from the pickup head with a recording region RF gain when the light spot is moving within a recording region of the DVD-RAM disc;

a header region 4T peak-to-peak detector electrically connected to the variable gain amplifier, for detecting a header region peak-to-peak level of an amplified header region RF signal generated by the variable gain amplifier when the light spot is moving within a VFO1 column of the header region;

a recording region long-T peak-to-peak detector electrically connected to the variable gain amplifier, for detecting a recording region peak-to-peak level of an amplified recording region RF signal generated by the variable gain amplifier when the light spot is moving within the recording region; and a feedback circuit electrically connected to the header region 4T peak-to-peak detector, the recording region long-T peak-to-peak detector, and the variable gain amplifier, for comparing the header region peak-to-peak level with a header region target level and adjusting the header region RF gain accordingly, and for comparing the recording region peak-to-peak level with a recording region target level and adjusting the recording region RF gain accordingly.

12. The apparatus of claim 11, wherein the feedback circuit comprises:

a comparator electrically connected to the header region 4T peak-to-peak detector and the recording region long-T peak-to-peak detector, for comparing the header region peak-to-peak level with the header region target level, and for comparing the recording region peak-to-peak level with the recording region target level; and a charge pump electrically connected between the comparator and the variable gain amplifier, for adjusting the header region RF gain according to a comparing result generated by the comparator through comparing the header region peak-to-peak level with the header region target level, and for adjusting the recording region RF gain according to a comparing result generated by the comparator through comparing the recording region peak-to-peak level with the recording region target level.

13. The apparatus of claim 12, further comprising:

a first multiplexer electrically connected to the header region 4T peak-to-peak detector, the recording region long-T peak-to-peak detector, and the comparator, for selectively sending the header region 4T peak-to-peak level or the recording region long-T peak-to-peak level to the comparator according to a header region indication signal; and a second multiplexer electrically connected to the comparator, for selectively sending the header region target level or the recording region target level to the comparator according to the header region indication signal.

* * * * *